(12) United States Patent  (10) Patent No.: US 8,220,265 B2
Greuter et al.  (45) Date of Patent: Jul. 17, 2012

(54) INTERNAL COMBUSTION ENGINE WITH A VARIABLE GEOMETRY COMPRESSOR

(75) Inventors: Rainer Greuter, Wattens (AT); Johann Hirzinger, Kössen (AT); Johann Klausner, St. Jakob (AT)

(73) Assignee: GE Jenbacher GmbH & CO OHG, Jenbach (AT)

( * ) Notice: Subject to any disclaimer, the term of this patent is extended or adjusted under 35 U.S.C. 154(b) by 856 days.

(21) Appl. No.: 12/232,077

(22) Filed: Sep. 10, 2008

(65) Prior Publication Data

US 2009/0071149 A1 Mar. 19, 2009

(30) Foreign Application Priority Data

Sep. 13, 2007 (AT) ................................ A 1433/2007

(51) Int. Cl.
*F02B 33/44* (2006.01)
(52) U.S. Cl. .......................................... 60/611; 60/603
(58) Field of Classification Search .................. 60/295, 60/297, 276, 602, 603, 611; 123/299, 337
See application file for complete search history.

(56) References Cited

U.S. PATENT DOCUMENTS

| 4,356,801 | A | * | 11/1982 | Graham ......................... 123/337 |
| 4,418,537 | A | * | 12/1983 | Iwamoto et al. ................ 60/611 |
| 5,694,899 | A | | 12/1997 | Chvatal et al. |
| 6,244,050 | B1 | | 6/2001 | Aschner et al. |
| 6,408,625 | B1 | | 6/2002 | Woon et al. |
| 6,672,060 | B1 | | 1/2004 | Buckland et al. |
| 2004/0144079 | A1 | * | 7/2004 | Nagai et al. ..................... 60/276 |
| 2004/0226287 | A1 | * | 11/2004 | Edgar et al. ..................... 60/295 |
| 2008/0156293 | A1 | * | 7/2008 | Huang ........................... 123/299 |
| 2009/0070021 | A1 | * | 3/2009 | Leone et al. ................... 701/113 |

FOREIGN PATENT DOCUMENTS

| DE | 39 39 754 | 6/1991 |
| DE | 103 29 763 | 2/2004 |
| EP | 0 757 169 | 2/1997 |
| EP | 1 158 149 | 11/2001 |
| GB | 2 105 878 | 3/1983 |

OTHER PUBLICATIONS

G. Morgan, G. Rzevski, P. Wiese, Journal of Systems and Control Engineering, issue I3 vol. 218 (2004), pp. 157-171.*
Austrian Search Report issued Jul. 28, 2008 in the corresponding Austrian patent application (with English translation).

* cited by examiner

*Primary Examiner* — Mary A Davis
(74) *Attorney, Agent, or Firm* — Wenderoth, Lind & Ponack, L.L.P.

(57) ABSTRACT

A method is provided for operating a stationary internal combustion machine including a compressor device of variable compressor geometry which compresses gas fed to the internal combustion machine, and a throttle device which is connected downstream of the compressor device and with which the amount of compressed gas fed to the internal combustion machine is variable. The internal combustion machine is regulated by way of the actuation of at least two adjusting members, wherein the internal combustion machine is regulated to a—preferably substantially constant—engine regulating value. Upon a deviation in the engine regulating value from a reference value, the amount of gas fed to the internal combustion machine is altered by the actuation of the throttle device as the first adjusting member and by the variation in the geometry of the compressor device as the second adjusting member so that the engine regulating value is re-set to the reference value.

34 Claims, 2 Drawing Sheets

US 8,220,265 B2

INTERNAL COMBUSTION ENGINE WITH A VARIABLE GEOMETRY COMPRESSOR

BACKGROUND OF THE INVENTION

The invention concerns, on the one hand, a method of operating a stationary internal combustion machine, in particular a gas engine, comprising a compressor device of variable compressor geometry which compresses gas fed to the internal combustion machine, and a throttle device which is connected downstream of the compressor device and with which the amount of compressed gas fed to the internal combustion machine is variable. The internal combustion machine is regulated by way of the actuation of at least two adjusting members. On the other hand, the invention concerns a regulating device for regulating at least one engine regulating value of a stationary internal combustion machine having a compressor device and a throttle device, in which at least two adjusting members can be influenced by way of the regulating device. Finally the invention concerns a stationary internal combustion machine, in particular a gas engine, having a compressor device of variable geometry for compressing gas fed to the engine and a throttle device connected downstream of the compressor device for quantitative limitation of the compressed gas fed to the internal combustion machine and a generator having such an internal combustion machine.

In order to regulate an engine regulating value such as power output or rotary speed in the case of an internal combustion machine such as an internal combustion engine, in particular a stationary gas engine, in most cases there are a plurality of adjusting members on the internal combustion machine. Primarily the throttle flap in the induction tract is actuated as the adjusting member. In the case of a forced-induction internal combustion machine, it is possible for the power output or rotary speed to be additionally influenced for example by way of a controllable valve (blow-off valve) as a second adjusting member which is arranged parallel to the compressor in the induction tract of the internal combustion engine. EP 0 757 169 B1 proposes for example a regulating system in which the engine regulating value is regulated in different operating states at different power outputs or rotary speeds by way of displacement of a respective adjusting member. In that case, there is only ever one respective adjusting member that is displaced by an associated regulator while the other adjusting member is held in a fixed position. In specific terms EP 0 757 169 B1 proposes, as respective adjusting members for regulating the engine parameter, altering the throttle flap position and the opening of the blow-off valve. Such a regulating system has proven to be advantageous in operation in different operating states.

Frequently, stationary internal combustion machines of the general kind set forth are used for generating current in the island mode of operation or in the emergency power mode or for mains network parallel operation. Depending on the respective mode of operation, it is necessary for the output power or the rotary speed of the internal combustion machine to be kept constant. The susceptibility to trouble and the increasing sensitivity of the electrical device driven directly or indirectly by such an internal combustion machine make it necessary for the respective engine parameters to be kept constant with a very high level of precision even in fluctuating situations. Fluctuating situations can occur, for example, due to disturbance influences or changes in load.

SUMMARY OF THE INVENTION

The object of the present invention is therefore to provide a method and devices of the general kind set forth in the opening part of this specification, with which it is possible to achieve a higher level of regulating accuracy to a given—for example constant—engine regulating value.

That object is attained by the features of the independent claims.

The corresponding method relates to operating a stationary internal combustion machine, in particular a gas engine, comprising a compressor device of variable compressor geometry which compresses gas fed to the internal combustion machine, and a throttle device which is connected downstream of the compressor device and with which the amount of compressed gas fed to the internal combustion machine is variable. The internal combustion machine is regulated by way of the actuation of at least two adjusting members. The internal combustion machine is regulated to a—preferably substantially constant—engine regulating value and upon a deviation in the engine regulating value from a reference value the amount of gas fed to the internal combustion machine is altered by the actuation of the throttle device as the first adjusting member and by the variation in the geometry of the compressor device as the second adjusting member so that the engine regulating value is re-set to the reference value.

A corresponding regulating device regulates at least one engine regulating value of a stationary internal combustion machine comprising a compressor device and a throttle device, in which at least two adjusting members can be influenced by way of the regulating device. A first adjusting member is provided for varying the position of the throttle device, and a second adjusting member is provided for varying the geometry of the compressor device. In the operating state upon a regulating deviation of the engine regulating value from the reference value, the amount of gas fed to the internal combustion machine can be regulated by way of the regulating device by the position of the throttle device as the first adjusting member and the geometry of the compressor device as the second adjusting member being variable.

The corresponding stationary internal combustion machine, in particular a gas engine, comprises a compressor device of variable geometry for compressing gas fed to the engine and a throttle device connected downstream of the compressor device for quantitative limitation of the compressed gas fed to the internal combustion machine. The machine also includes a regulating device, preferably of the kind set forth hereinbefore, and at least two adjusting members. In the operating state, the regulating device regulates the internal combustion machine to a—preferably substantially constant—engine regulating value by way of the alteration of the at least two adjusting members, by the regulating device actuating the throttle device as the first adjusting member and altering the geometry of the compressor device as the second adjusting member.

The invention is based on the idea of using two adjusting members for the regulation operation, with which the amount of gas fed to the internal combustion machine is rapidly directly variable. One advantage of the invention is also that no additional volumes due to by-pass lines have to be introduced into the induction tract, which would involve a regulating delay. The system acts on the amount of gas fed to the internal combustion machine immediately and directly both by virtue of the change in the geometry in the compressor device and also by virtue of the throttle flap position.

Further details and advantages of the invention will be apparent from the dependant claims.

For the method it can additionally be provided in particular that the internal combustion machine operates a generator. In that case—particularly in the island mode of operation or in the emergency power mode of operation—it is preferably provided that the generator is regulated at a constant rotary speed and thus at a fixed frequency so that the risks of damage to sensitive terminal devices is minimised.

In the mains network parallel mode of operation, it is particularly advantageously provided that the internal combustion machine is regulated to a constant power output. In that case, for example, in the generator mode a constant amount of power is always fed into a mains network.

For the method it can further be provided that the internal combustion machine operates a generator or a mechanical direct drive. In that case, it is particularly preferably provided that the internal combustion machine is regulated to a constant rotary speed and/or the internal combustion machine is regulated to a constant output power. It is further desirable if the compressor device is operated by way of an exhaust gas turbine as in that way there is no need for an additional drive for the compressor device.

In addition, it is advantageously provided that the gas flowing to the throttle device is cooled, in which respect an embodiment advantageously provides that the gas fed to the compressor device is a fuel/air mixture.

Depending on the respective deviation of the engine regulating value from the corresponding reference value, it may be advantageous in some load ranges, such as a first load range, if the variation in the geometry of the compressor device is effected at least at times in a delayed relationship and/or more slowly than actuation of the throttle device. In other load ranges, such as a second load range, it may be advantageously provided that the throttle device and the variation in the geometry of the compressor device are effected substantially synchronously at least at times. Finally it may be advantageous if in a load range—preferably in a third (upper) load range—at least at times, upon changes in load of below 5%, the throttle device is held in a constant position, preferably in the completely opened position, and re-adjustment to the engine regulating value is effected by way of the variation in the geometry of the compressor device.

The last three options can be combined together in the individual load ranges, wherein the reference to upper load range is used in particular with more than 50% of the maximum power output. However only one of the three variants may also be provided, depending on the respective regulator characteristic.

A corresponding regulating device preferably has at least two regulators, wherein at least one respective regulator is associated with the respective adjustment value. The regulators can be of different design configurations depending on the respective situation for which the regulating device is used. It is preferably provided that at least some of the regulators are PID-regulators. Different regulator characteristics (for example delays, reduced-speed regulation or adjusting mode of operation) can be achieved for example by previously inserting a dead band, that is to say a waiting time, before the regulator starts, different integral portions in a PID-regulator or adjusting mode procedures and so forth in per se known manner.

It is preferably provided in that respect that the at least two regulators are of such a design configuration that the variation in the geometry of the compressor device is effected with a delay at least at times with respect to the influencing of the position of the throttle device.

It can further be provided that the regulating device is adapted so that at least at times, preferably in the upper load region, upon a deviation in the engine regulating value of below 5% from the reference value, the throttle device is held in a substantially constant position and regulation is effected substantially by way of the variation in the geometry of the compressor device. Finally it can be provided that the regulating device is designed so that, upon a deviation in the regulating value of at least 5% from the reference value, it influences both adjusting values—preferably synchronously—and that an adjusting value limitation is associated with the regulating device so that the actuation of at least one adjusting member is limited so that the amount of gas fed to the internal combustion machine does not exceed a preferably predeterminable maximum value and/or at least one regulator has a dead band for delaying the change in the adjusting member.

The stationary internal combustion engine, in particular a gas engine, can be further characterised in that the engine regulating value is a constant rotary speed of the internal combustion machine. It can also be provided that the engine regulating value is a constant output power of the internal combustion machine.

In an advantageous variant, the regulator device can have a compressor device which is operable by way of an exhaust gas turbine. It is further provided that the engine regulating value is the power output and/or the rotary speed of the internal combustion machine.

The invention further concerns a generator with an internal combustion machine as set forth hereinbefore and a regulating device as set forth hereinbefore for the internal combustion machine.

BRIEF DESCRIPTION OF THE DRAWINGS

Further details and advantages of the invention will be described in the specific description and with reference to the diagrammatic drawings in which.

DETAILED DESCRIPTION OF THE INVENTION

Figure 1:
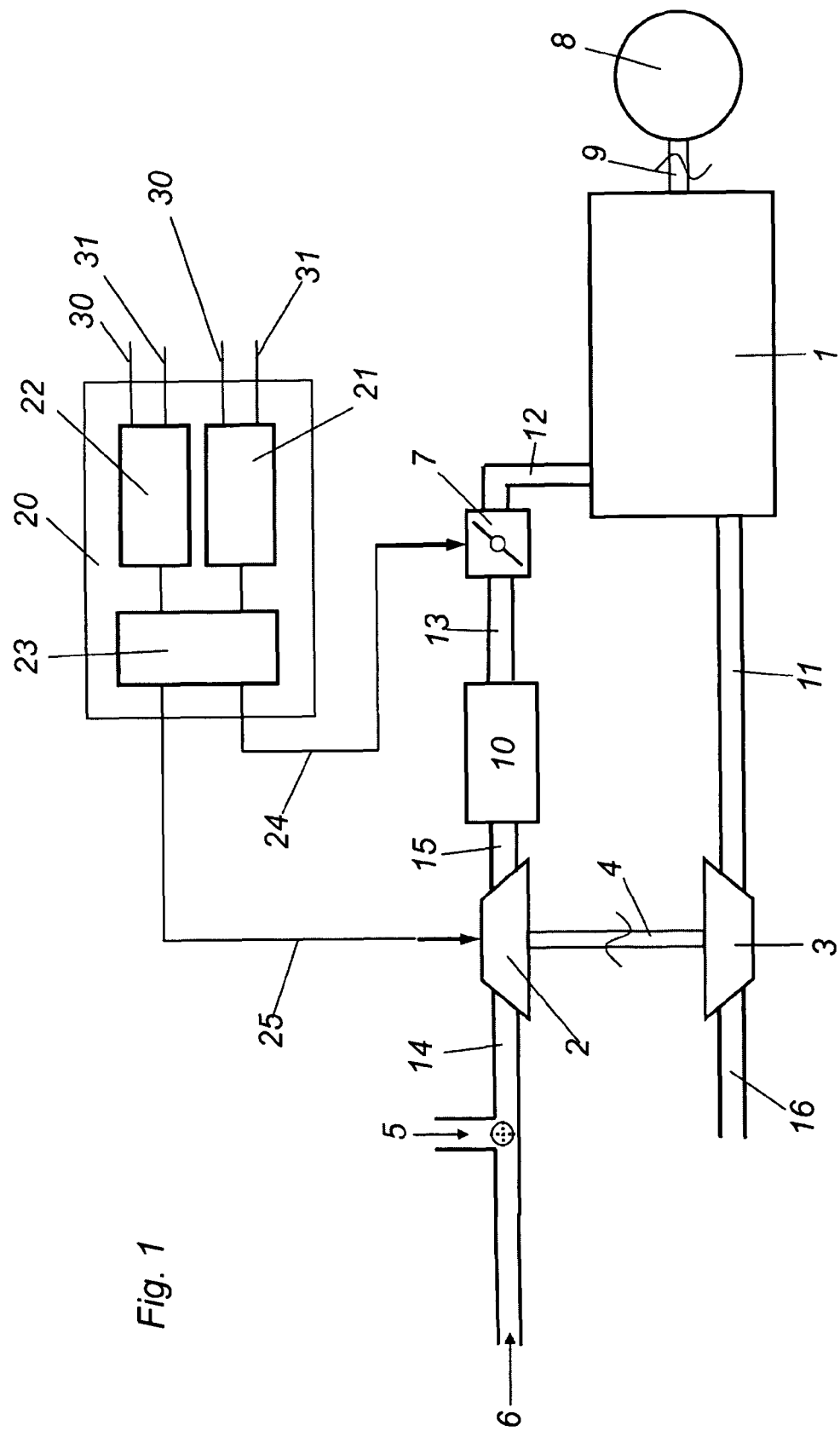
FIG. 1 diagrammatically shows an embodiment of an internal combustion machine according to the invention with a generator.

FIG. 1 shows a stationary internal combustion machine 1. The illustrated embodiment represents a gas engine. The internal combustion machine 1 is fed with air 5 and fuel 6, by the air 5 and the fuel 6 in gas form being mixed at the node point (the node point thus forms a mixing device). The air 5 and the fuel 6 form a gas mixture which is fed to the compressor device 2 by way of the line 14. The compressor device 2 is connected by way of a shaft 4 to an exhaust gas turbine 3 arranged in the exhaust tract 11 of the internal combustion machine 1. The exhaust gas turbine 3 is operated by way of the exhaust gases from the internal combustion machine 1.

The compressor device 2 has a variable turbine geometry in accordance with per se known state of the art. By way of example, vanes or blades are arranged in the compressor device 2 which are actuable by an actuator (not shown) and thus alter the position in the compressor device 2. In that way, the flow of gas in the compressor device 2 can be altered, whereby greater or lesser compression of the gas (here air 5 and fuel 6 mixture) occurs in the compressor device 2, this having a direct effect on the power output p of the internal combustion machine 1.

The fuel/air mixture which is now compressed (compressed gas in accordance with the claim) is fed to a cooling device 10 by way of the line 15 connected downstream of the compressor device 2 as the compressed fuel/air mixture is greatly heated by being compressed. Connected downstream of the cooling device 10 is a line 12 which leads to the throttle device 7 (throttle flap) which regulates the amount of fuel/air mixture to the internal combustion machine 1 by way of the line 12. In accordance with EP 0 757 169 B1, a by-pass line with valve (blow-off valve) with which the amount of mixture can also be regulated would be disposed between the line 13 (which is arranged between the compressor device 2 and the throttle flap 7 and which in the illustrated embodiment is also disposed downstream of the optional cooling device 10) and the line 14. In the device according to the invention, it is possible to dispense with such a by-pass line, but there is also the possibility of adding it to have a third adjusting member for regulation.

The illustrated internal combustion machine 1 drives a generator 8 by way of a shaft 9. At this point, the actual output power $n_{actual}$ or the engine speed $n_{actual}$ is also ascertained, which serve as engine regulating parameters. The actual regulating device is identified by reference 20. The regulating device 20 has two regulators 21, 22. In that case, the first regulator 21 is associated with the throttle flap 7 (throttle flap regulator 21). The second regulator 22 is associated with the adjusting member for varying the geometry at the compressor device 2 (VTG regulator 22). The engine regulating value 30 (detected for example by sensors), preferably power output $p_{actual}$ or rotary speed $n_{actual}$, is fed to both regulators 21, 22. The respective reference value 31 $p_{ref}$ or $n_{ref}$ is fed both to the throttle flap regulator 21 and also to the VTG regulator 22. The respective regulators 21, 22 form the regulating deviation by comparing the actual value of the engine regulating value 30 with the reference value 31. The respective regulator 21, 22 ascertains therefrom a corresponding signal which acts on the regulating section by way of the corresponding adjusting member (throttle flap 7 or means for varying the geometry of the compressor device 2) and which counteracts the regulating deviation. The corresponding signal is fed to the corresponding adjusting members 7, 2 by way of the lines 24, 25. In the illustrated embodiment, there is also a linking device 23 so that the two regulators 21, 22 are matched to each other and it is only upon a corresponding regulating deviation that both or only one adjusting member 7, 2 is influenced as described hereinbefore.

The difference between the reference value 31 and the actual value 30 is formed at the linking point 32 and fed to the regulator 21 or 22. The regulators can be for example in the form of PID-regulators or PI-regulators. It will be appreciated that other regulators are also possible (such as for example an adjusting operator means). The engine regulating value is re-set for example with a PID-regulator from the corresponding regulating deviation, by a procedure whereby the corresponding adjusting members 7, 2 are actuated with a signal by way of the signal lines 24, 25. So that no 'over-regulation' occurs, linked to damage to or an adverse effect on the internal combustion machine 1, adjusting value limiters 26, 27 can also be connected at a downstream location so that the throttle flap 7 can only be opened to a maximum value of, for example, 30%. Similarly the corresponding means for varying the geometry of the compressor device 2 can be correspondingly limited.

Figure 2:
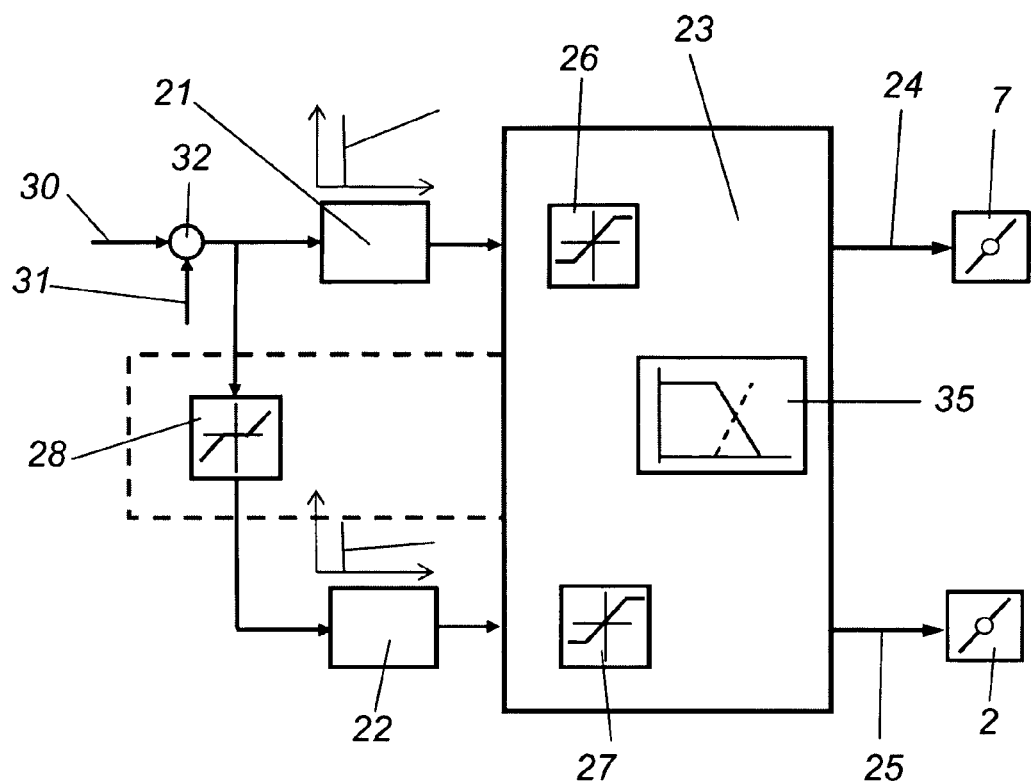
FIG. 2 shows an embodiment of a regulating device according to the invention.

FIG. 2 shows a preferred embodiment illustrating how a corresponding regulating device 20 could look in practice. At the linking point 32, the reference value 30 is compared to the actual value 31, and the corresponding signal is passed to the throttle flap regulator 21 and the VTG regulator 22. Connected upstream of the VTG regulator 22 is a dead band 28 so that the VTG regulator 22 could come into operation with a delay. By way of example, a delay of fractions of a second could be provided in order not to cause excessive regulation, with an only very short fluctuation in the engine regulating signal. The regulator characteristic of the two regulators 21, 22 is also correspondingly different, as indicated in the diagrams illustrated above the regulators 21, 22. In the example, the throttle flap regulator 21 is a PID-regulator with a steeper integral portion than the VTG regulator 22. As a result, regulation is effected more strongly by way of the throttle flap 7 than by way of the change in geometry of the compressor device 2. Connected downstream of the two regulators 21, 22 is a logic means 23 which represents the adjusting value limiter 26 and 27, respectively, for the respective adjusting value so that, for safety reasons, an excessively great adjusting signal is not passed from the regulator output to the throttle flap 7 or the compressor device 2.

Reference 35 symbolically represents a possible switching logic means 35 characterising the respectively dominant regulator (% regulator as a function of the load). As stated above, an embodiment provides that, in the upper load range, the VTG regulator 22 (broken line) provides for primary regulation while in the lower load range the throttle flap regulator 21 (solid line) performs primary regulation. In the transitional range, in particular at the point of intersection of the two lines, the system provides for equal-priority regulation of the throttle flap regulator 21 and the VTG regulator. It will be appreciated that other curve configurations can also be envisaged, and it is only a preferred embodiment that is shown. In the case of intervention of a disturbance (for example a shift in load and a collapse in rotary speed related thereto), it would be possible to provide an adjustment mode in respect of the upstream diffuser wheel, and the return to the properly regulated condition could be effected by way of a PID-procedure at the VTG regulator. In the adjustment mode, it can be provided that, for those situations where the reference value of the engine regulating value exceeds a predetermined maximum deviation, the corresponding adjusting member (in particular the geometry at the compressor device) is not actuated in direct (for example proportional) relation to the regulating deviation, but is altered to a given value (for example complete opening can be provided). That is more desirably effected if an upstream-disposed dead band is provided after the dead band is exceeded.

The invention claimed is:
1. A method of operating a stationary internal combustion machine, said method comprising:
   regulating the internal combustion machine to maintain a substantially constant engine regulating value by actuating at least two adjusting members including a first adjusting member comprising a compressor device having a variable compressor geometry for compressing gas fed to the internal combustion machine, and a second adjusting member comprising a throttle device connected downstream of the compressor device and configured to vary an amount of compressed gas fed to the internal combustion machine; and
   when the engine regulating value deviates from a reference value, altering the amount of compressed gas fed to the internal combustion machine to re-set the engine regulating value to the reference value by:
   actuating the throttle device; and
   varying a geometry of the compressor device;
   wherein said varying of the geometry of the compressor device in a first load range is one of (i) delayed with respect to said actuating of the throttle device; (ii) slower than said actuating of the throttle device; and (iii) both delayed with respect to said actuating of the throttle device and slower than said actuating of the throttle device.

2. A method of claim 1, further comprising using the internal combustion machine to operate a generator or mechanical direct drive.

3. The method of claim 1, wherein said regulating the internal combustion machine comprises maintaining a constant rotary speed of the internal combustion machine output shaft.

4. The method of claim 1, wherein said regulating the internal combustion machine comprises maintaining a constant output power of the internal combustion machine.

5. The method of claim 1, further comprising operating the compressor device by an exhaust gas turbine.

6. The method of claim 1, further comprising cooling the gas flowing to the throttle device.

7. The method of claim 1, further comprising feeding a fuel/air mixture to the compressor device.

8. The method of claim 1, wherein said actuating of the throttle device and said varying the geometry of the compressor device are substantially synchronously in a second load range.

9. The method of claim 1, wherein, in a third load range resulting in a deviation in the engine regulating value of less than 5% from the reference value, the throttle device is positioned and held in a completely open position, and the engine regulating value is re-set to the reference value by way of said varying of the geometry of the compressor device.

10. The method of claim 1, wherein said varying of the geometry of the compressor device is delayed using at least one dead band.

11. The method of claim 10, further comprising providing an adjusting operating mode upon obtaining a deviation in the engine regulating value from a predetermined maximum value after the dead band is exceeded.

12. The method of claim 11, wherein said adjusting operating mode substantially completely opens the geometry of the compressor device.

13. The method of claim 1, wherein said varying of the geometry of the compressor device is delayed with respect to said actuating of the throttle device by fractions of a second.

14. A regulating device for regulating an engine regulating value of a stationary internal combustion machine, said regulating device comprising:
  a throttle device including a first adjusting member for varying a position of said throttle device; and
  a compressor device including a second adjusting member for varying a geometry of said compressor device, said first adjusting member and said second adjusting member being configured so that, upon a regulating deviation of the engine regulating value from a reference value, the position of said throttle device and said geometry of said compressor device will be varied so as to regulate an amount of gas fed to the internal combustion machine;
  a first regulator associated with said first adjusting member; and
  a second regulator associated with said second adjusting member;
  wherein a controller controls said first regulator and said second regulator to delay a variation in said geometry of said compressor device with respect to a variation in the position of said throttle device in a first load range.

15. The regulating device of claim 14, wherein said first regulator and said second regulator are configured to maintain the engine regulating value at a substantially constant reference value.

16. The regulating device of claim 14, wherein the engine regulating value is one of (i) power of the internal combustion machine, (ii) rotary speed of the internal combustion machine, and (iii) both the power and the rotary speed of the internal combustion machine.

17. The regulating device of claim 14, wherein said compressor device is configured to be driven by an exhaust gas turbine.

18. The regulating device of claim 14, wherein said first regulator and said second regulator are configured so that, in a second load range resulting in a deviation in the engine regulating value of less than 5% from the reference value, said throttle device is positioned and held in a substantially constant position, and the engine regulating value is re-set to the reference value by varying said geometry of said compressor device.

19. The regulating device of claim 14, wherein said first regulator and said second regulator are configured so that said first adjusting member and said second adjusting member are actuated upon a deviation of the engine regulating value of at least 5% from the reference value.

20. The regulating device of claim 14, wherein at least one of said first regulator and said second regulator comprises a PID-regulator.

21. The regulating device of claim 14, wherein said first regulator and said second regulator have an adjusting value limitation so that an actuation of at least one of said first adjusting member and said second adjusting member is limited such that the amount of gas fed to the internal combustion machine does not exceed a predetermined maximum value.

22. The regulating device of claim 14, wherein at least one of said first regulator and said second regulator has an associated dead band for delaying a variation in a respective one of said first adjusting member and said second adjusting member.

23. The regulating device of claim 22, wherein said dead band is configured to permit a deviation in the regulating value from the reference value of up to 5%.

24. The regulating device of claim 22, wherein said first regulator and said second regulator are configured to enter an adjusting operating mode upon a deviation in the engine regulating value by a predeterminable maximum value after said dead band is exceeded.

25. The regulating device of claim 24, wherein, in the adjusting operating mode, said first regulator and said second regulator vary the geometry of the compressor device so that said compressor device is substantially completely opened.

26. The regulating device of claim 14, wherein said first regulator and said second regulator are configured to delay a variation of the geometry of said compressor device with respect to a variation of the position of said throttle device by fractions of a second than one second.

27. A stationary internal combustion gas engine, comprising:
  a compressor device having a variable geometry for compressing gas fed to a block of the engine;
  a throttle device downstream of said compressor device for limiting an amount of compressed gas to be fed to the block of the engine;
  a first adjusting member for actuating said throttle device;
  a second adjusting member for varying a geometry of said compressor device; and
  at least one regulator configured to actuate said first adjusting member and said second adjusting member to maintain an engine regulating value;
  wherein said at least one regulator is configured to delay a variation in said geometry of said compressor device with respect to an actuation of said throttle device in a first load range.

28. The stationary internal combustion gas engine of claim 27, further comprising an exhaust gas turbine configured to drive said compressor device.

29. The stationary internal combustion gas engine of claim 28, further comprising a cooling device between said compressor device and said throttle device, said cooling device being configured to cool gas flowing to said throttle device.

30. The stationary internal combustion gas engine of claim 27, wherein the engine regulating value is a constant rotary speed of the internal combustion machine.

31. The stationary internal combustion gas engine of claim 27, wherein the engine regulating value is a constant output power of the internal combustion machine.

32. The stationary internal combustion gas engine of claim 27, further comprising a mixing device upstream of said compressor device for mixing fuel and air.

33. The stationary internal combustion gas engine of claim 27, wherein said at least one regulator is configured to delay a variation of the geometry of said compressor device with respect to a variation of the position of said throttle device by fractions of a second.

34. A generator having the stationary internal combustion gas engine of claim 27.

* * * * *